US010311450B2

(12) United States Patent
Bjelajac et al.

(10) Patent No.: US 10,311,450 B2
(45) Date of Patent: Jun. 4, 2019

(54) SYSTEM AND METHOD FOR MANAGING CUSTOMER FEEDBACK

(71) Applicant: GENESYS TELECOMMUNICATIONS LABORATORIES, INC., Daly City, CA (US)

(72) Inventors: Cris Bjelajac, Westford, MA (US);
David Sudbey, Daly City, CA (US);
John Tallarico, Daly City, CA (US);
Marc Verschoor, Rhoon (NL)

(*) Notice: Subject to any disclaimer, the term of this patent is extended or adjusted under 35 U.S.C. 154(b) by 624 days.

(21) Appl. No.: 14/448,888

(22) Filed: Jul. 31, 2014

(65) Prior Publication Data
US 2016/0034918 A1  Feb. 4, 2016

(51) Int. Cl.
*G06Q 10/00* (2012.01)
*G06Q 30/02* (2012.01)

(52) U.S. Cl.
CPC ............................... *G06Q 30/0201* (2013.01)

(58) Field of Classification Search
CPC ................................................ G06Q 30/0201
See application file for complete search history.

(56) References Cited

U.S. PATENT DOCUMENTS 7,343,406 B1    3/2008   Buonanno et al.
7,460,653 B2 * 12/2008   Brahm ............... G06Q 20/3674
                                                      379/142.05
8,971,499 B1 *  3/2015   Moore ................ H04M 3/5166
                                                      379/1.02
9,148,512 B1 *  9/2015   Kumar ................ H04M 3/5232
9,767,510 B2 *  9/2017   Altberg .................. G06Q 10/10
2001/0044729 A1 * 11/2001 Pomerance ............ G06Q 10/10
                                                      705/309
2002/0138338 A1 *  9/2002 Trauth ............. G06Q 10/06311
                                                      705/7.13
2003/0073440 A1 *  4/2003 Mukherjee .............. H04L 29/06
                                                      455/435.1

(Continued)

FOREIGN PATENT DOCUMENTS

JP          200965698 A       3/2009

OTHER PUBLICATIONS

"A Formal Process for Evaluating COTS Software Products", Lawlis et al., 2001, IEEE.*

(Continued)

*Primary Examiner* — Jonathan G Sterrett

(57) ABSTRACT

In a method for managing customer feedback, the method includes: receiving, by a processor, an answer to a survey question, wherein the answer to the survey question is associated with a customer; transmitting, by the processor, a notification to a first electronic device, in response to the answer to the survey question having a value less than a threshold value; receiving, by the processor, a reply communication via a first communication medium from the first electronic device, wherein the reply communication comprises an instruction to contact the customer; and initiating a connection, by the processor, between the first electronic device and a second electronic device associated with the customer in a second communication medium different from the first communication medium in response to the receiving of the reply communication.

18 Claims, 10 Drawing Sheets

(56) References Cited

U.S. PATENT DOCUMENTS

| | | | | |
|---|---|---|---|---|
| 2003/0197615 | A1* | 10/2003 | Roche | G08B 21/22 340/573.1 |
| 2004/0139450 | A1* | 7/2004 | Hope | G06Q 10/00 719/318 |
| 2006/0074708 | A1* | 4/2006 | Woods | G06F 19/363 705/2 |
| 2006/0143025 | A1* | 6/2006 | Jeffery | G06Q 10/06 705/7.32 |
| 2006/0259309 | A1* | 11/2006 | Pigott | G06Q 10/06 705/304 |
| 2006/0262922 | A1* | 11/2006 | Margulies | G06Q 30/02 379/265.12 |
| 2007/0160054 | A1 | 7/2007 | Shaffer et al. | |
| 2007/0233549 | A1* | 10/2007 | Watson | G06Q 10/06398 379/266.1 |
| 2008/0263137 | A1* | 10/2008 | Pattison | H04L 12/66 709/203 |
| 2008/0310604 | A1* | 12/2008 | Agarwal | G06Q 30/02 379/88.18 |
| 2009/0254531 | A1* | 10/2009 | Walker | G06Q 30/02 |
| 2009/0276279 | A1 | 11/2009 | Quesnel et al. | |
| 2010/0324961 | A1* | 12/2010 | Singh | G06Q 30/016 705/304 |
| 2011/0106579 | A1* | 5/2011 | Nair | G06Q 30/02 705/7.28 |
| 2011/0206198 | A1* | 8/2011 | Freedman | G06Q 30/06 379/265.03 |
| 2011/0270770 | A1* | 11/2011 | Cunningham | G06Q 30/016 705/304 |
| 2012/0116840 | A1* | 5/2012 | Omer | G06Q 30/02 705/7.29 |
| 2013/0006789 | A1* | 1/2013 | Fulkerson | G06Q 10/00 705/26.1 |
| 2013/0083916 | A1 | 4/2013 | Flockhart et al. | |
| 2014/0163961 | A1* | 6/2014 | Whitten | G06F 17/2785 704/9 |
| 2014/0355487 | A1* | 12/2014 | Sterman | H04M 3/42 370/259 |
| 2016/0034930 | A1 | 2/2016 | Verschoor et al. | |

OTHER PUBLICATIONS

"The StratoSIP Manual", P Zave, GW Bond, E Cheung, TM Smith—2012—Citeseer.*
Computer telephony integration and its applications SL Chou, YB Lin—IEEE Communications Surveys & Tutorials, 2000—ieeexplore.ieee.org.*
"Contact Center with Mobile Agents", N Burvall—2008—diva-portal.org (Year: 2008).*
"Session Initiation Protocol" retrieved from the web at: http://web.archive.org/web/20140327153211/https://en.wikipedia.org/wiki/Session_Initiation_Protocol, archived on Mar. 27, 2014 (Year: 2014).*
RFC 3261—SIP: Session Initiation Protocol, Network Working Group Memo for standards. © 2002 The Internet Society, pp. 1-270. (Year: 2002).*
International Search Report and Written Opinion of the International Searching Authority for International Application No. PCT/US2015/043013, dated Oct. 30, 2015, 17 pages.

* cited by examiner

SYSTEM AND METHOD FOR MANAGING CUSTOMER FEEDBACK

CROSS-REFERENCE TO RELATED APPLICATIONS

This application is related to U.S. Application entitled "System and Method for Managing Customer Feedback" filed on even date herewith, the content of which is incorporated herein by reference.

FIELD

Aspects of embodiments of the present invention relate to systems and methods for managing customer feedback.

BACKGROUND

In order to remain competitive in the modern commerce system, many businesses must remain constantly vigilant of evolving consumer demands, and always strive to provide customers with the high quality products and services that they desire. To that end, businesses enterprises often seek customer feedback in order to learn information about consumer preferences or to improve aspects of their business.

One common method that businesses use to obtain customer feedback is to develop survey questions asking customers about their experiences with particular products, services, or agent interactions. It may be difficult, however, to extrapolate conclusions about broader aspects of a business enterprise based on survey responses when survey questions are narrowly tailored for a particular purpose. Additionally, although an individual customer's survey answers may identify the customer as having negative attitudes about a business, its products, or its services, merely identifying a dissatisfied customer does not provide any value to the business unless there is a mechanism for the business to take some action to resolve the customer's concerns.

The above information discussed in this Background section is only for enhancement of understanding of the background of the described technology and therefore it may contain information that does not constitute prior art that is already known to a person having ordinary skill in the art.

SUMMARY

Aspects of embodiments of the present invention include a system and method for managing customer feedback.

According to embodiments of the present invention, in a method for managing customer feedback, the method includes: receiving, by a processor, an answer to a survey question, wherein the answer to the survey question is associated with a customer; transmitting, by the processor, a notification to a first electronic device, in response to the answer to the survey question having a value less than a threshold value; receiving, by the processor, a reply communication via a first communication medium from the first electronic device, wherein the reply communication comprises an instruction to contact the customer; and initiating a connection, by the processor, between the first electronic device and a second electronic device associated with the customer in a second communication medium different from the first communication medium in response to the receiving of the reply communication.

The method may further include transmitting, by the processor, the survey question to the second electronic device.

The method may further include initiating, by the processor, a first communication with the first electronic device and a second communication with the second electronic device prior to the initiating of the connection of the first electronic device to the second electronic device.

The method may further include transmitting, by the processor, profile information regarding the customer.

The notification may include a short message service text message.

The reply communication may include a short message service text message.

The method may further include initiating one or more alternative communications to one or more electronic devices associated with the customer in response to the connection between the first electronic device and the second electronic device not being successful.

The method may further include identifying, by the processor, a plurality of key performance indicators (KPIs); and generating, by the processor, a user interface for creating the survey question and establishing a relative weight for a corresponding key performance indicator among the plurality of KPIs.

The first communication medium may include a short messaging service text message and the second communication medium may include a voice communication.

The method may further include associating, by the processor, the answer to the survey question with a corresponding key performance indicator (KPI); calculating, by the processor, a KPI score for the answer to the survey question based on the corresponding KPI and the answer to the survey question normalized to a predetermined range of scores; and outputting, by the processor, the KPI score for prompting an action in response.

According to embodiments of the present invention, in a system for managing customer feedback, the system includes: a processor; and a memory coupled to the processor, wherein the memory stores instructions that, when executed by the processor, cause the processor to: receive an answer to a survey question, wherein the answer to the survey question is associated with a customer; transmit a notification to a first electronic device, in response to the answer to the survey question having a value less than a threshold value; receive a reply communication via a first communication medium from the first electronic device, wherein the reply communication comprises an instruction to contact the customer; and initiate a connection between the first electronic device and a second electronic device associated with the customer in a second communication medium different from the first communication medium in response to the receiving of the reply communication.

The instructions may further cause the processor to transmit the survey question to the second electronic device.

The instructions may further cause the processor to initiate a first communication with the first electronic device and a second communication with the second electronic device prior to the initiating of the connection of the first electronic device to the second electronic device.

The instructions may further cause the processor to transmit profile information regarding the customer.

The notification may include a short message service text message.

The reply communication may include a short message service text message.

The instructions may further cause the processor to initiate one or more alternative communications to one or more electronic devices associated with the customer in response to the connection between the first electronic device and the second electronic device not being successful.

The instructions may further cause the processor to: identify a plurality of key performance indicators (KPIs); and generate a user interface for creating the survey question and establishing a relative weight for a corresponding key performance indicator among the plurality of KPIs.

The first communication medium may include a short messaging service text message and the second communication medium may include a voice communication.

The instructions may further cause the processor to: associate the answer to the survey question with a corresponding key performance indicator (KPI); calculate a KPI score for the answer to the survey question based on the corresponding KPI and the answer to the survey question normalized to a predetermined range of scores; and output the KPI score for prompting an action in response.

According to embodiments of the present invention, in a method for managing customer feedback, the method includes: receiving, by a processor, a survey response to a survey question; associating, by the processor, the survey response with a corresponding key performance indicator (KPI); calculating, by the processor, a KPI score for the survey response to the survey question based on the corresponding KPI and the survey response, wherein the KPI score is normalized to a predetermined range of scores; and outputting, by the processor, the KPI score for prompting an action in response.

The predetermined range of scores may be between 0 and 1, inclusive.

The method may further include receiving, by the processor, a relative weight for the corresponding KPI; and normalizing, by the processor, the survey response with respect to the corresponding KPI based on the relative weight.

The method may further include storing, by the processor, the KPI score for the survey response in a memory.

The method may further include displaying, by the processor, information regarding the KPI score on a display.

The method may further include identifying, by the processor, a plurality of KPIs; and generating, by the processor, a user interface for creating the survey question and establishing a relative weight for the corresponding KPI among the plurality of KPIs.

The method may further include transmitting, by the processor, a request to answer the survey question to an electronic device operated by a customer; and receiving, by the processor, the survey response from the electronic device.

The method may further include transmitting, by the processor, a notification to a first electronic device, in response to the survey response to the survey question having a value less than a threshold value; receiving, by the processor, a reply communication in a first communication medium from the first electronic device, wherein the reply communication comprises an instruction to contact a customer associated with the survey response; and initiating a connection, by the processor, between the first electronic device and a second electronic device associated with the customer in a second communication medium different from the first communication medium in response to the receiving of the reply communication.

The first communication medium may include a short messaging service text message and the second communication medium may include a voice communication.

The method may further include transmitting, by the processor, the survey question to an electronic device associated with a customer.

According to embodiments of the present invention, in a system for managing customer feedback, the system includes: a processor; and a memory coupled to the processor, wherein the memory stores instructions that, when executed by the processor, cause the processor to: receive a survey response to a survey question; associate the survey response with a corresponding key performance indicator (KPI); calculate a KPI score for the survey response to the survey question based on the corresponding KPI and the survey response, wherein the KPI score is normalized to a predetermined range of scores; and output the KPI score for prompting an action in response.

The predetermined range of scores may be between 0 and 1, inclusive.

The instructions may further cause the processor to: receive a relative weight for the corresponding KPI; and normalize the survey response with respect to the corresponding KPI based on the relative weight.

The instructions may further cause the processor to store the KPI score for the survey response in a memory.

The instructions may further cause the processor to display information regarding the KPI score on a display.

The instructions may further cause the processor to: identify a plurality of KPIs; and generate a user interface for creating the survey question and establishing a relative weight for the corresponding KPI among the plurality of KPIs.

The instructions may further cause the processor to: transmit a request to answer the survey question to an electronic device operated by a customer; and receive the survey response from the electronic device.

The instructions may further cause the processor to: transmit a notification to a first electronic device, in response to the survey response to the survey question having a value less than a threshold value; receive a reply communication in a first communication medium from the first electronic device, wherein the reply communication comprises an instruction to contact a customer associated with the survey response; and initiate a connection between the first electronic device and a second electronic device associated with the customer in a second communication medium different from the first communication medium in response to the receiving of the reply communication.

The first communication medium may include a short messaging service text message and the second communication medium may include a voice communication.

The instructions may further cause the processor to transmit the survey question to an electronic device associated with a customer.

Thus, according to some aspects of the present invention, a system and method for managing customer feedback provides a mechanism for leveraging the answers to customer feedback survey questions to allow an enterprise or business to learn information about the KPIs relevant across, for example, the entire enterprise or business. Thus, even though the wording of survey questions may change, the types of questions may change, and/or surveys may only be partially completed by customers, any input that is obtained from the consumers in response to the surveys can be used to generate meaningful data about KPIs that may be relevant across the entire platform.

Additionally, according to some aspects of the present invention, when a customer is identified as a detractor, a communication system automatically generates and sends a message to a manager positioned to resolve the customer's complaints. Therefore, the customer's concerns may be resolved early and effectively.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
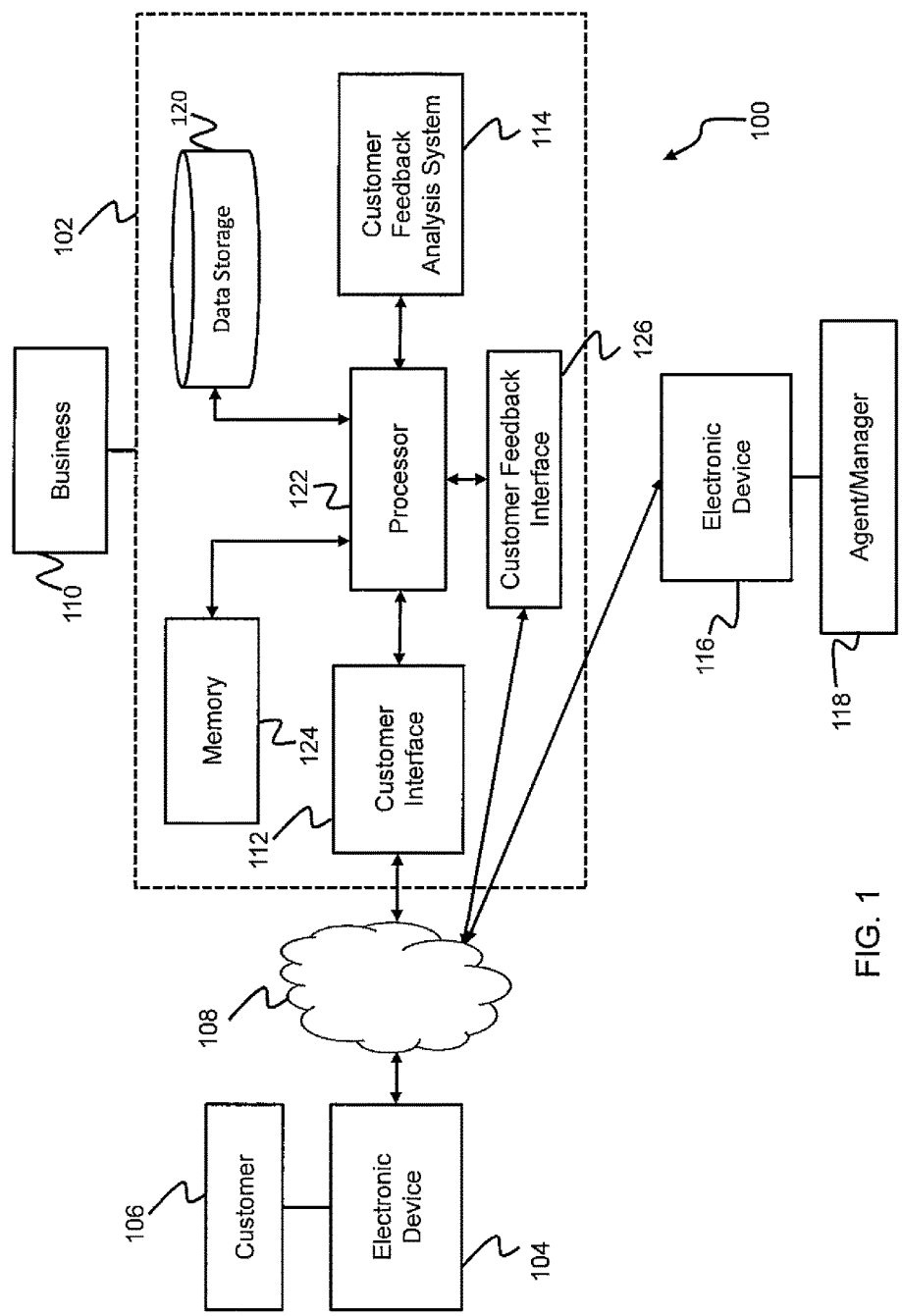
FIG. 1 illustrates a schematic block diagram of a system for managing customer feedback according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

In general terms, embodiments of the present invention are directed to a system and method for managing customer feedback. One common mechanism for obtaining customer feedback is simply to ask customers about their experiences with the business at the completion of a transaction. For example, a team in charge of a particular product line may solicit feedback from customers who have purchased the product by asking the customer to answer survey questions about that particular product and their experience purchasing or using the product. Depending on the size and organization of the business enterprise, however, the team involved in developing the survey questions may do so with the narrow goal of learning information about the customer experience related to that specific product without regard for broader key performance indicators (KPIs) that may be relevant to the entire business enterprise. Furthermore, over time, survey questions may evolve as products and services evolve and as the business's understanding of consumers evolves. Thus, it may be difficult for businesses to accurately track consumer sentiment over time when the language of survey questions changes over time.

Additionally, different survey creators may phrase similar questions in different ways. For example, when asking customers about their experiences interacting with agents and the quality of those agents, different survey questions may ask "was the agent friendly?", "did the agent understand my needs?", "did the agent show empathy towards my problems," and other questions that generally ask a consumer to identify their perception of the friendliness and quality of agents. Although each of the questions may relate to the same broad KPI (e.g., agent quality), the different ways that specific survey questions are phrased for the narrow and specific purpose of the survey creator may make it difficult for the business enterprise to measure and analyze the performance of the business in broader and more general terms.

Accordingly, embodiments of the present invention are directed to providing a mechanism for leveraging the answers to customer feedback survey questions to allow an enterprise or business to learn something about the KPIs relevant across, for example, the entire enterprise or business. In this regard, when a manager of the business creates survey questions, the business takes the additional steps of attributing the questions to one or more corresponding KPIs and assigning weights to the perceived relevance of the question to the KPIs such that answers can be normalized across a wide variety of surveys. Thus, even though the wording of survey questions may change, the types of questions may change, and/or surveys may only be partially completed by consumers, any input that is obtained from the consumers in response to the surveys can be used to generate meaningful data about KPIs that may be relevant across the entire platform.

Additionally, the process of collecting customer may feedback may enable businesses to identify whether particular customers are "promoters" or "detractors" of the business or particular products. For example, survey questions may be designed to ask customers whether or not they are likely to recommend a product or the business to a friend or colleague. If a customer answers a question in a way that indicates a high likelihood of recommending a product or a business to a friend or colleague (e.g., by answering 9 or 10 on a scale of 1 to 10), the customer may be identified as a "promoter." A customer who is a "promoter" is likely to encourage friends and colleagues to also purchase the same product or service or otherwise interact with a business. At a minimum, a promoter may be generally less likely to disparage the product, service, or business.

By contrast, if a customer answers a survey question in a way that indicates a low likelihood of recommending a product, service, or business to a friend or colleague (e.g., by answering 6 or less on a scale of 1 to 10), the customer may be identified as a "detractor." A customer who is a "detractor" may be less likely to be a repeat customer, and may be more likely to discourage friends and colleagues to also purchase the same product or service or otherwise interact with a business. At a minimum, a detractor may be generally less likely to speak highly of the product, service, or business.

Thus, it is beneficial for businesses to identify detractors in order to prevent harm to the business's reputation. Merely identifying an individual customer as a detractor, however, does not help a business enterprise if there is no mechanism for the business enterprise to take some corrective action to resolve the customer's concerns. Therefore, when a customer is identified as a detractor, either with respect to a specific product or service, or with respect to a business overall, embodiments of the present invention are directed to enabling the business to quickly, conveniently, and automatically initiate a communication with the customer to allow the business to attempt to resolve the customer's dissatisfaction. Once a customer is identified as a detractor, a communication system automatically generates and sends a message to a manager positioned to resolve the customer's complaints. The communication system may send a notification message to the manager's device (e.g., a text message), providing details about the customer's profile and complaints, and asking whether or not the manager would like to contact the customer. If the manager would like to attempt to resolve the customer's complaints, the manager can simply send a reply message (e.g., by simply sending a reply text "call") to request a connection with the customer. That is, the manager need not dial a separate call to the customer, but the call may be initiated from the notification message itself. In response, the communication system initiates a voice call to the manager. Once the manager is connected to the voice call, the communication system initiates a voice call to the customer. If the customer answers, the communication system bridges the manager with the customer in a conference to allow the manager to attempt to resolve the customer's dissatisfaction.

FIG. 1 is a schematic block diagram of a customer feedback management system 100 according to some embodiments of the present invention. The customer feedback management system 100 includes a customer feedback server 102 coupled to (i.e., in electronic communication with) an end-user electronic device 104 operated by a customer 106 over a data communications network 108 such as, for example, a local area network or a wide area network (e.g., a public Internet).

The customer feedback server 102 may be operated by a business 110 (e.g., a retailer or service provider) offering certain product lines or services to the customer 106 as part of the commerce system. The customer feedback server 102 includes one or more software modules (e.g., customer feedback interface 112 and customer feedback analysis system 114, described in more detail below) for coordinating communication with the customer 106 by way of the electronic device 104 and the network 108 during a communication session occurring in the knowledge management control system 100.

The customer feedback server 102 is also coupled to (i.e., in electronic communication with) an electronic device 116 operated by an agent or manager 118 of the business 110 over the data communications network 108 such as, for example, a local area network operated by the business 110 or a wide area network (e.g., a public Internet). The agent or manager 118 may operate the electronic device 116 to engage with the customer feedback interface 112 to generate or analyze customer feedback surveys as will be described in more detail below. Additionally, the agent or manager 118 may view information about the customer 106 or communicate with the customer 106 in response to survey questions answered by the customer 106.

The customer feedback server 102 is also coupled to a mass storage device or database 120 such as, for example, a disk drive, drive array, flash memory, magnetic tape, or other suitable mass storage device for storing information used by the customer feedback server 102. For example, the mass storage device 120 may store profile information about the customer 106 operating the electronic device 104, communication history information related to products or services provided by the business 110, and other contextual information regarding the customer 106 that may be relevant to the business 110 for engaging in effective and profitable interactions with the customer 106.

The customer feedback server 102 further includes a processor or central processing unit (CPU) 122, which executes program instructions and interacts with other system components to perform various methods and operations according to embodiments of the present invention. The CPU 122 may include (or be in electronic communication with), for example, a graphics processing unit (GPU) for processing signals and data to display images on a display.

The customer feedback server 102 further includes a memory 124, which operates as an addressable memory unit for storing software instructions to be executed by the CPU 122. The memory 124 is implemented using any suitable memory device, such as a random access memory (RAM), and may additionally operate as a computer-readable storage medium having non-transitory computer readable instructions stored therein that when executed by a processor cause the processor to control and manage a communication between the electronic devices 104 and 116, the customer interface 112, a customer feedback generation interface 126, and the customer feedback analysis system 114.

According to one embodiment of the invention, the electronic devices 104 and 116 may connect to the data communications network 108 using a telephone connection, satellite connection, cable connection, radio frequency communication, or any suitable wired or wireless data communication mechanism. To this end, the electronic devices 104 and 116 may take the form of a personal computer (PC), hand-held personal computer (HPC), television and set-top-box combination, personal digital assistant (PDA), tablet or touch screen computer system, telephone, cellular telephone, smartphone, or any suitable consumer electronics device.

The customer feedback server 102 includes a customer feedback interface 126 for providing the agent or manager 118 of the business to develop and create survey questions for customers regarding products and services provided by the business 110 and regarding customer experiences interacting with the business 110. For example, the manager 118 may be a member of a team in charge of developing or selling a specific product, and wishes to ask customers about their opinions regarding certain features of the product. The manager 118 may further wish to know information about customers' interactions with agents of the business 110 who help customers with purchases or product support or whether customers find it easy to conduct business with the business 110. The manager 118 may also wish to know whether, to what extent, and why or why not customers would recommend the product or the business overall to others.

Accordingly, as will be illustrated in more detail below, using the electronic device 116 to interact with the customer feedback interface 126, the manager 118 may generate a series of survey questions to provide to future customers regarding their experiences with the product, service, or business interaction. The survey may be stored in the data storage 120, and provided to the customer 106 by way of the customer interface 112.

The customer interface module 112 provides customers with an interface for communicating with the business 110. For example, the customer interface module 112 may be an online storefront, in which the customer 106 can create a profile, order products and/or services, interact with employees or agents of the business 110, or otherwise engage in commercial transactions with the business 110 over the communications network 108. Additionally, the customer interface 112 may provide a graphical or voice response interface for enabling customers to receive and answer questions regarding various aspects of the business 110 and products and/or services provided by the business 110.

For example, the customer interface module 112 may take the form of a website, internet-connected application, or other electronic communication (e.g., email or audio communication) for the customer to enter responses, for example, using an electronic form or audio response interface, to answer questions about a particular product, service, or interaction with an agent of the business 110. The answers to the customer's questions are stored in the data storage 120 for subsequent or real-time analysis by the customer feedback analysis system 114.

The customer feedback analysis system 114 is a computer system capable of receiving customer feedback in the form of customer answers to survey questions and calculating a normalized KPI score according to KPI weights established by the manager 118 at the time of the survey creation.

Figure 2:
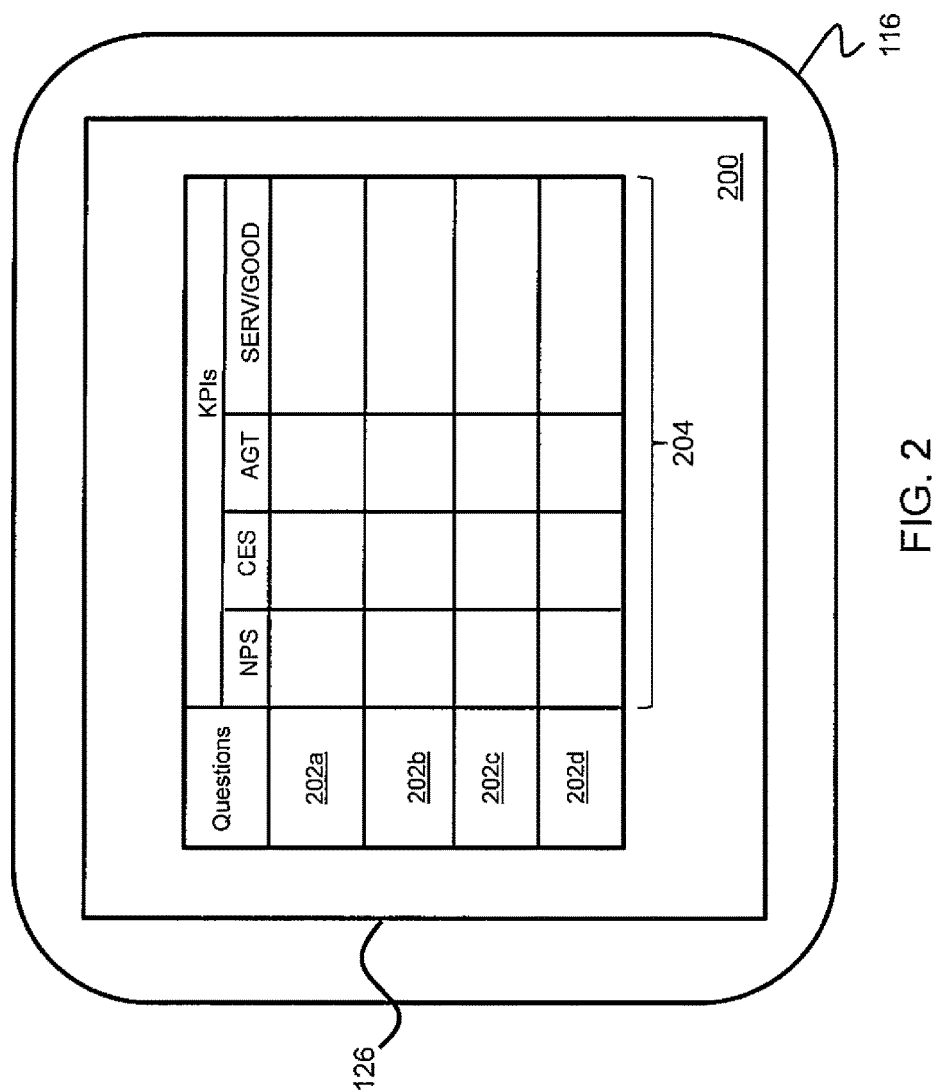
FIG. 2 illustrates some details of a customer feedback interface according to some embodiments of the present invention.

FIG. 2 illustrates further detail of the customer feedback interface 126 according to some embodiments of the present invention. The manager 118 may access the customer feedback interface 126 by way of the electronic device 116 to display the customer feedback interface 126 on a display 200 of the electric device 116.

Prior to the manager 118 creating survey questions using the customer feedback interface 126, the business 110 may define or establish one or more key performance indicators (KPIs) that the business 110 would like to track. For example, as illustrated in FIG. 2, KPIs established by the business 110 may include: net promoter score (NPS) for determining the extent to which consumers would recommend the business 110 or the products or services sold by the business 110 to friends or colleagues; customer effort score (CES) for determining how easy consumers perceive it to be to conduct business with the business 110; agent quality (AGT) for determining the quality of service provided in customer interactions with agents; and customers' perceived quality of the services or goods (SERV/GOOD) that sold by the business 110. The KPIs tracked by the business 110 are not limited to those discussed above, and may include any additional categories of key performance indicators relevant to the business objectives of the business 110.

The customer feedback interface 126 may include a plurality of text fields 202a-202d for entering one or more survey questions. The number of text fields may vary according to the design of the customer feedback interface 126 and the number of questions that the manager 118 desires to create. The text fields 202a-202d may additionally include a field for entering a range of possible answer choices. For example, a scale of 1-10 or yes/no.

Additionally, the customer feedback interface 126 may include a plurality of fields 204, corresponding to each of the questions and each of the KPIs to enable the manager to attribute the questions to one or more of the KPIs and additionally assign a weight, if any, to be applied to the question for the attributed KPI. As will be discussed in more detail below, by allowing the manager 118 to attribute each question of a survey to one or more relevant KPIs and to assign a weight to the question for each relevant KPI, customer answers can be normalized as applied to a relevant KPI to allow the business 110 to track and compare data regarding customer answers to questions that relate to the broad KPIs. Thus, according to embodiments of the present invention, a user interface is provided to enable quantified survey responses to be "attributed" to one or more relevant KPIs to apply a computational meaning to individual survey question responses that can enable a KPI score to be calculated across the entire business enterprise.

The KPIs are a constant factor in the system such that, for each survey question created in the user interface, the user is entering the attribution category and weight. When the survey version is finalized, the combined weight for the category is computed and is recomputed to an attribution factor. The attribution factor considers the questions answered and the weight of those questions, and the weight is distributed accordingly between zero and one (i.e., normalized to a total value of 1.0).

Table 1 below illustrates an example user input for generating survey questions using the customer feedback interface 126 and attributing each question to corresponding relevant KPI categories and assigning a corresponding weight.

TABLE 1

| | Questions | Attribution and Weight | | | |
|---|---|---|---|---|---|
| | | NPS | CES | AGT | SERV/GOOD |
| 1 | On a scale from 1 to 5, did the person who assisted you today understand your issue immediately? | | 5 | 5 | |
| 2 | On a scale from 1 to 5, did you find the person who assisted you today helpful? | | 3 | 5 | |
| 3 | On a scale from 1 to 5, how likely is it that you would recommend our company to your friends and family? | 5 | | | 2 |
| 4 | On a scale from 1 to 5, how likely is it that you would recommend the specific services or goods that the call was about to your friends and family? | 2 | | | 5 |

As illustrated in table 1, above, for each question, at the time of survey creation, the person or entity creating the survey questions attributes each question to one or more relevant KPI categories and assigns an attribution weight for each relevant KPI category. The weight may be established according to business rules or the perceived relative weight of the relevance of the KPI category to the question compared to other questions in the survey mapped to the same KPI category.

For example, as shown in the example of table 1, the first question asks how well the person assisting a consumer understood the consumer's issue immediately. The manager creating the survey determines that the question is relevant to the KPI categories of CES and AGT, and designates an attribution weight of 5 and 5 for each of those KPI categories, respectively. The second question asks whether the consumer found the person who assisted the consumer during the interaction was helpful. The creator of the survey determines that the question is relevant to the KPI categories of CES and AGT, and designates an attribution weight of 3 and 5 for each of those KPIs, respectively. Thus, the creator of the survey may perceive the KPI category of AGT to be slightly more relevant to the second question than the KPI category of CES.

The third question asks how likely it is that the consumer would recommend the company or enterprise interacting with the consumer to friends and family, which the survey creator determines is relevant to the KPI categories of NPS and SERV/GOOD, and designates a weight of 5 and 2, respectively. The fourth question asks how likely it is that the consumer would recommend the specific goods or services that the call or interaction was about to friends and family, which the survey creator determines is relevant to the KPI categories of NPS and SERV/GOOD, and designates a weight of 2 and 5, respectively.

The survey questions and corresponding KPI categories and weights, of course, are not limited to those discussed above. Instead, for each survey created by a survey creator, the actual questions and phrasing of the questions may vary according to the business needs of the business. Further, the attributed KPI categories for each survey question and the corresponding weight of each question to the attributed KPI categories may vary according to the business needs of the business.

Once the survey questions are established, and relevant KPI categories are identified and attribution weights are applied to the relevant KPI categories for each question, the survey questions can be provided to consumers to provide their response. Then, an attribution factor is computed in real time for each question that is answered by a consumer, considering the weights assigned to each relevant attribution category or KPI, such that the attribution factor is normalized to a predetermined value (e.g., 1), as illustrated in table 2, below.

Table 2 illustrates the result of calculating the attribution factor for each question considering the attribution weights assigned to each KPI category for each question.

where $AF_i$ is the attribution factor for an individual KPI category/question i, $W_i$ is the weight assigned to the KPI category for the category/question i, and $W_{total}$ is the total sum of the weights assigned to all of the question in a survey for a single KPI category.

For example, with respect to the KPI category of NPS, no attribution weight was given for questions 1 and 2, and attribution weights of 5 and 2 were given for questions 3 and 4, respectively. Thus, the sum of the attribution weights $W_i$ for the KPI category of NPS is 7, because the attribution weight of 5 plus the attribution weight of 2 (for questions 3 and 4, respectively) is equal to 7. Therefore, as illustrated in table 2, the attribution factor AF for the attribution category of NPS for question 3 is ~0.714286, because the attribution weight of 5 for question 3 divided by 7, the sum of the attribution weights for the KPI category of NPS, is equal to ~0.714286. Similarly, the attribution factor for the KPI category of NPS for question 4 is ~0.285714, because the attribution weight of 2 for question 4, divided by 7, is equal to ~0.285714.

With respect to the KPI category of CES, an attribution weight of 5 and 3 was given for questions 1 and 2, respectively, and no attribution weight was given for questions 3 and 4. Thus, the sum of the attribution weights $W_i$ for the KPI category of CES is 8, because the attribution weight of 5 plus the attribution weight of 3 (for questions 1 and 2, respectively) is equal to 8. Therefore, as illustrated in table 2, the attribution factor for the KPI category of CES for question 1 is 0.625, because the attribution weight of 5 for question 1 divided by 8, the sum of the attribution weights for the KPI category of CES, is equal to 0.625. Similarly, the attribution factor for the KPI category of CES for question 2 is 0.375, because the attribution weight of 3 for question 2, divided by 8, is equal to 0.375.

TABLE 2

| | | Attribution Factor | | | |
| --- | --- | --- | --- | --- | --- |
| | Questions | NPS | CES | AGT | SERV/GOOD |
| 1 | On a scale from 1 to 5, did the person who assisted you today understand your issue immediately? | | 0.625 | 0.5 | |
| 2 | On a scale from 1 to 5, did you find the person who assisted you today helpful? | | 0.375 | 0.5 | |
| 3 | On a scale from 1 to 5, how likely is it that you would recommend our company to your friends and family? | 0.714286 | | | 0.285714 |
| 4 | On a scale from 1 to 5, how likely is it that you would recommend the specific services or goods that the call was about to your friends and family? | 0.285714 | | | 0.714286 |

Thus, as illustrated in table 2 above, the attribution factor is calculated for each KPI category and each question such that the combination of the attribution factor for each question within a particular KPI category is equal to 1 according to the following equation (1):

$$AF_i = \left(\frac{W_i}{W_{total}}\right) \quad (1)$$

With respect to the KPI category of AGT, an attribution weight of 5 and 5 was given for questions 1 and 2, respectively, and no attribution weight was given for questions 3 and 4. Thus, the sum of the attribution weights for the KPI category of AGT is 10, because the attribution weight of 5 plus the attribution weight of 5 (for questions 1 and 2, respectively) is equal to 10. Therefore, as illustrated in table 2, the attribution factor for the KPI category of AGT for question 1 is 0.5, because the attribution weight of 5 for question 1 divided by 10, the sum of the attribution weights for the KPI category of AGT, is equal to 0.5. Similarly, the attribution factor for the KPI category of AGT for question 2 is 0.5, because the attribution weight of 5 for question 2, divided by 10, is equal to 0.5.

With respect to the KPI category of SERV/GOOD, no attribution weight was given for questions 1 and 2, and an attribution weight of 2 and 5 was given for questions 3 and 4, respectively, and no attribution weight was given for questions 3 and 4. Thus, the sum of the attribution weights for the KPI category of SERV/GOOD is 7, because the attribution weight of 2 plus the attribution weight of 5 (for questions 3 and 4, respectively) is equal to 7. Therefore, as illustrated in table 2, the attribution factor for the KPI category of SERV/GOOD for question 3 is ~0.285714, because the attribution weight of 2 for question 3 divided by 7, the sum of the attribution weights for the KPI category of SERV/GOOD, is equal to ~0.285714. Similarly, the attribution factor for the KPI category of SERV/GOOD for question 4 is ~0.714286, because the attribution weight of 5 for question 4, divided by 7, is equal to ~0.714286.

Thus, the example above illustrates that for each applicable KPI category for a given survey category, the attribution factor adjusts the weights given by the manager establishing the survey such that the total attribution factor for a given KPI category is equal to 1. Accordingly, even though over time there may be many different versions of similar surveys or survey questions, survey results can be normalized to a weighted attribution to any category of relevant KPIs. Therefore, survey responses can be compared even if survey questions are asked in a different way and even if the survey method is changed along the way. Further, attribution factors are calculated at runtime or after receiving survey answers, which allows survey results to be calculated in a normalized form and applied to the business's real-time and historical reporting of performance for a given KPI.

Once the attribution factor is calculated for each of the received survey responses, the overall KPI attributed score for a given KPI can be calculated as a sum of the attribution factor multiplied by a response factor for each question that is answered. In order to calculate a response factor Rf, each of the questions is mapped to a response number R among a total number N of possible responses. For example, in the case of a binary question (i.e., a yes or no question), the response number R can be either 1 or 2 (depending on the question and the customer's answer) and the total number N of possible responses is 2. Alternatively, the question may ask to answer the question on a scale, for example, from 1-5 or 1-10, in which case the response number R can be any number from 1-5 or 1-10, respectively, and the total number N of possible responses is 5 or 10, respectively. The total number of possible responses may vary according to the design of the question.

When the survey response is received, the response factor for each question can be calculated according to equation 2, below:

$$Rf = (R-1) * \left(\frac{1}{N-1}\right) \quad (2)$$

Where Rf is the response factor for the question, R is an integer representing the actual response to the survey question, and N is an integer representing the total number of possible responses to the survey question.

An inverse response factor $Rf_{inv}$ can be calculated for questions phrased in an inverse way such that lower numbers correlate to a more positive response (e.g., "did you have a bad experience, yes or no?", or "what is the likelihood that you will return the product on a scale of 1 to 10?") according to equation 3, below:

$$Rf_{inv} = (N-R) * \left(\frac{1}{N-1}\right) \quad (3)$$

Table 3, below, illustrates sample responses to each of the questions shown in table 1. In particular, as shown in table 3, the consumer answers each of the questions 1-4.

TABLE 3

| | Questions | Value Corresponding to Response |
|---|---|---|
| 1 | On a scale from 1 to 5, did the person who assisted you today understand your issue immediately? | 4 |
| 2 | On a scale from 1 to 5, did you find the person who assisted you today helpful? | 5 |
| 3 | On a scale from 1 to 5, how likely is it that you would recommend our company to your friends and family? | 5 |
| 4 | On a scale from 1 to 5, how likely is it that you would recommend the specific services or goods that the call was about to your friends and family? | 3 |

Thus, as shown in table 3, each of the questions 1-4 have a possible response ranging from 1 to 5, and the customer answers 4, 5, 5, and 3, respectively.

Table 4 illustrates the result of calculating the response factor for each question based on the value corresponding to the consumer's responses in table 3 by applying equation 2 to each of the corresponding answers. If the question were phrased in an inverse way, equation 3 would be applied.

TABLE 4

| | Questions | Response Factor |
|---|---|---|
| 1 | On a scale from 1 to 5, did the person who assisted you today understand your issue immediately? | 0.75 |
| 2 | On a scale from 1 to 5, did you find the person who assisted you today helpful? | 1 |
| 3 | On a scale from 1 to 5, how likely is it that you would recommend our company to your friends and family? | 1 |
| 4 | On a scale from 1 to 5, how likely is it that you would recommend the specific services or goods that the call was about to your friends and family? | 0.5 |

Thus, as illustrated in table 4 above, with respect to question 1, the customer response was 4 out of 5. Therefore, the response factor Rf for question 1 is $(4-1)*(\frac{1}{4})=0.75$. With respect to question 2, the customer response was 5 out of 5. Therefore, the response factor Rf for question 2 is $(5-1)*(\frac{1}{4})=1$. With respect to question 3, the customer response was also 5 out of 5, yielding a response factor Rf of 1. Finally, with respect to question 4, the customer response was 3 out of 5. Therefore, the response factor Rf for question 3 is $(3-1)*(\frac{1}{4})=0.5$.

Thus, as illustrated in table 4 above, the response factor may be calculated for each attribution category and each question, in real time, in response to the questions answered by the consumer for the given set of survey questions.

Once the response factor for each question is calculated, a KPI attributed score, $KPI_{AS}$, can then be computed as the sum of each of the response factors applicable to the response, multiplied by the attribution factor for each question according to equation (4), below:

$$KPI_{AS}=RF*AF \quad (4)$$

Table 5 illustrates the result of calculating the KPI attributed for each question and each KPI category based on the corresponding response factor and the corresponding attribution factor using equation 4.

TABLE 5

| Questions | Attribution Factor | | | |
|---|---|---|---|---|
| | NPS | CES | AGT | SERV/GOOD |
| 1 On a scale from 1 to 5, did the person who assisted you today understand your issue immediately? | | 0.46875 | 0.375 | |
| 2 On a scale from 1 to 5, did you find the person who assisted you today helpful? | | 0.375 | 0.5 | |
| 3 On a scale from 1 to 5, how likely is it that you would recommend our company to your friends and family? | 0.714286 | | | 0.285714 |
| 4 On a scale from 1 to 5, how likely is it that you would recommend the specific services or goods that the call was about to your friends and family? | 0.142857 | | | 0.357143 |

Thus, as illustrated in table 5 above, the KPI attributed score is calculated for each KPI category and each question. Accordingly, when different versions of surveys are implemented by different business users or regarding different aspects of the business enterprise, the survey results can be normalized to a weighed attribution to any attribution category, which enables comparing survey responses, even when questions are asked in different ways or about different products/services, and even if the survey method is changed. Additionally, in some embodiments the survey attribution is performed at run time, and therefore the results can always be projected in a normalized form towards contact center real-time and historical reporting, allowing relatively less time to be spent by employees analyzing survey results, because survey questions will be normalized toward the relevant attribution categories or Key Performance Indicators (KPIs).

Thus, the example above illustrates that for each applicable KPI category for a given survey question, the attribution factor adjusts the weights given by the manager establishing the survey such that the total attribution factor for a given KPI is equal to 1. Accordingly, even though over time there may be many different versions of similar surveys or survey questions, survey results can be normalized to a weighted attribution to any category of relevant KPIs. Therefore, survey responses can be compared even if survey questions are asked in a different way and even if the survey method is changed along the way. Further, attribution factors are calculated at runtime or after receiving survey answers, which allows survey results to be calculated in a normalized form and applied to the business's real-time and historical reporting of performance for a given KPI. Additionally, in some instances, a particular consumer responding to survey questions will answer only some of the questions of the survey. Nonetheless, according to embodiments of the present invention, by calculating the KPI attributed score after receiving the survey responses, the portion of the survey that is completed can still be utilized to learn information about the KPI categories that correspond to the questions that are answered.

Accordingly, when different versions of surveys are implemented by different business users or regarding different aspects of the business enterprise, the survey results can be normalized to a weighed attribution to any attribution category, which enables comparing survey responses, even when questions are asked in different ways or about different products/services, and even if the survey method is changed. Additionally, in some embodiments the survey attribution is performed at run time, and therefore the results can always be projected in a normalized form towards contact center real-time and historical reporting, allowing relatively less time to be spent by employees analyzing survey results, because survey questions will be normalized toward the relevant attribution categories or Key Performance Indicators (KPIs).

According to some embodiments, the response factor or the KPI attributed score may be adjusted by a multiplier (e.g., between 0 and 1) to generate non-linear KPI attributed score distributions, or according to a non-linear mapping of potential responses to a corresponding response factor. That is, according to the design of the customer feedback management system 100, the business 110 may wish to increase or decrease the influence of certain answers, or the influence of certain customers' answers, on the KPI attributed score. For example, table 6, below illustrates an embodiment in which the response factor is determined according to a response factor mapping template.

TABLE 6

| Response | Response Factor |
|---|---|
| 1 | 0 |
| 2 | 0 |
| 3 | 0.3 |
| 4 | 0.6 |
| 5 | 1 |

Thus, as shown in table 6, for a question having a linear range of possible answers, each of the possible responses may be mapped to a corresponding response factor distributed in a non-linear fashion. For example, the business 110 may decide according to its business interests that only a response of 5 out of 5 should be given full weight with respect to impacting the KPI attributed score and mapped to the highest response factor (e.g., 1). Anything less than the highest possible score (e.g., less than 5 out of 5) may be designated as an indicator of a need to improve. Thus, as illustrated in table 6, the responses 3 and 4 may be mapped to response factors of 0.3 and 0.6, respectively, instead of 0.6 and 0.8, as would be the case in a linear distribution of response factors. Further, the responses 1 and 2 may be mapped to response factors of 0 and 0, respectively, because such responses may be deemed, according to the business objectives of the business 110, to be too low. Of course, the actual non-linear mapping of responses to response factors may vary according to the questions, the business interests of the business 110, and the design of the customer feedback management system 100.

Table 7, below, illustrates another example of non-linear mapping of responses to response factors.

TABLE 7

| Response | Response Factor | Designation |
|---|---|---|
| 1 | 0 | Detractor |
| 2 | 0 | Detractor |
| 3 | 0.5 | Neutral |
| 4 | 0.5 | Neutral |
| 5 | 1 | Promoter |

Thus, as shown in table 7, depending on the business objectives of the business 110, a customer may be designated as a detractor, neutral, or a promoter, depending on their responses, and their responses may therefore be mapped to corresponding response factors in a non-linear distribution according to some embodiments of the present invention. For example, the business 110 may decide according to its business interests that only responses of 5 out of 5 should be designated as that of a promoter such that they are mapped to a response factor of 1. By contrast, responses of 3 or 4 out of 5, may be designated as neutral, such that they are mapped to response factors of 0.5 and 0.5, respectively. Responses of 1 and 2, however, may be mapped to the lowest response factor (e.g., 0), because they may reflect a failure on the part of the business to satisfy the customer's needs and desires. Of course, the actual designation of responses as detracting, neutral, or promoting, and the corresponding mapping of responses to response factors may vary according to the questions, the business interests of the business 110, and the design of the customer feedback management system 100.

Once a KPI attributed score is calculated for a response, the KPI attributed score may be stored in memory (e.g., the memory 124 or the data storage 120) for subsequent analysis. Further, the KPI attribute score may be calculated in real time, or as each question is answered, thereby enabling the business 110 to keep track of real time updates for relevant KPIs as answers are received. For example, the customer feedback analysis system 114 may calculate an average KPI attributed score for display on the electronic device 116 by way of the customer feedback interface 126, thereby enabling the agent or manager 118 to keep track of customer feedback as it relates to relevant KPIs of the business 110.

The customer feedback analysis system 114 may additionally analyze responses to questions from individual customers, for example, to determine whether or not important customers are satisfied with the products or services of the business 110, or whether or not individual customers are detractors of the business 110, so that the business 110 can make an effort to resolve issues causing dissatisfaction.

Additionally, KPI attributed scores calculated from answers from certain customers (e.g., customers who are particularly important to the business 110) may be multiplied by a multiplier so that their opinions have a greater influence on the average KPI attributed score. By contrast, KPI attributed scores calculated from answers from other customers (e.g., less important customers, customers who are determined by the business 110 to consistently provide lower or higher than average responses, for example, due to the individual personalities or preferences of such customers, or customers who had a negative experience due to reasons other than the quality of the products or services of the business 110) may be multiplied by a multiplier so that their opinions have a lower influence on the average KPI attributed score.

The business 110 may further wish to track the feedback of individual customers over time to determine trends in the preferences or feedback of individual customers or customers within particular customer demographics over times. For example, customers may be grouped into various groups (e.g., important versus regular, male versus female, geographic locations, age groups, etc.) and separate KPI attributed scores may be calculated for each group. Additionally, the business 110 may track the feedback of individual customers over time to determine whether a KPI attributed score for that customer changes over time.

In each instance, by attributing each survey question to relevant KPI and normalizing responses, feedback from individual customers can be utilized to learn information that is relevant to the business 110 overall, even if the particular phrasing or context of questions changes over time or is narrowly tailored to a specific purpose.

Figure 3:
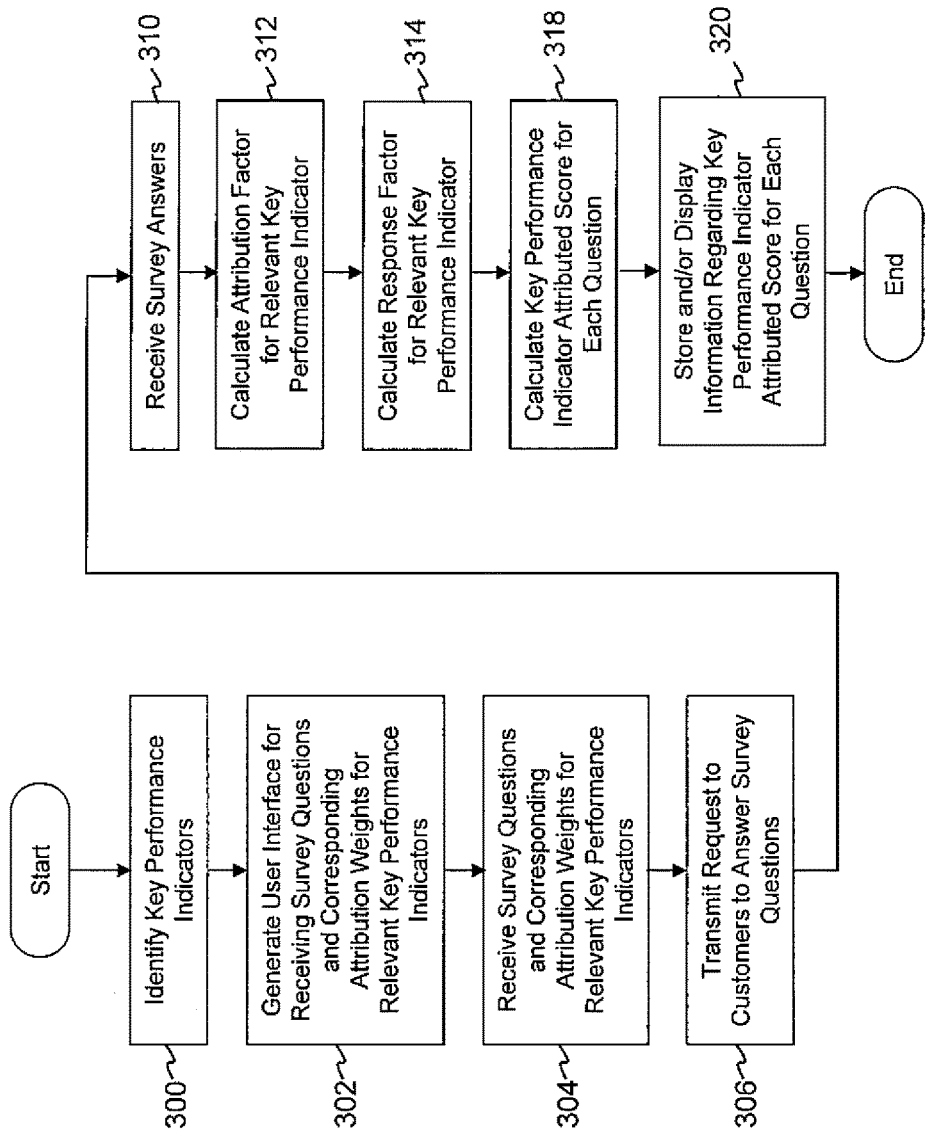
FIG. 3 illustrates a process for generating a KPI attributed score according to embodiments of the present invention.

FIG. 3 illustrates a process for generating a KPI attributed score according to embodiments of the present invention. The process starts and, at block 300, the customer feedback management system 100 identifies or receives a group of KPIs relevant to the business 110. For example, the KPIs may include net promoter score, which measures the extent to which customers would recommend goods or services of the business 110 to friends for colleagues. The KPIs may further include agent quality, which measures customers' perception of the quality of an interaction with an agent of the business 110. The KPIs may also include customers' perception of the quality of goods or services provided by the business 110. The KPIs may additionally include customer effort score, which measures customers' perception of the ease of doing business with the business 110. The KPI categories, however, are not limited to the above-listed KPI categories, and may additionally include any other categories of KPIs that are relevant to the business goals of the business 110.

At block 302, the customer feedback management system 100 generates a user interface (e.g., as shown in FIG. 2) for receiving survey questions and corresponding attribution weights for the relevant KPIs identified at block 300. At block 304, the customer feedback management system 100 receives survey questions and corresponding attribution weights for the relevant KPIs by way of the user interface, as illustrated with respect to FIG. 2. The survey questions and corresponding attribution weights are stored in memory (e.g., memory 120).

At block 306, when a customer completes an interaction with the business 110, for example, by terminating a telephone interaction with an agent of the business 110 or purchasing a product or service from the business 110, the customer feedback management system 100 transmits a request to the customer to answer the survey questions received at block 304. The questions may be displayed on the customer's electronic device by way of the customer interface 112, as discussed above.

If the customer agrees to answer the survey questions, at block 310, the customer feedback management system 100 receives one or more survey question answers (e.g., by way of the customer interface 112. At block 312, the customer feedback management system 100 calculates an attribution factor for each relevant KPI of each of the received survey question answers. At block 314, the customer feedback management system 100 calculates a response factor for each of the received survey question answers for each of the relevant KPIs.

At block 318, based on the calculated attribution factors and response factors, the customer feedback management system 100 calculates a KPI attributed score for of the received survey question answers for each relevant KPI as discussed above. At block 320, information regarding the KPI attributed score is stored in memory (e.g., the memory 120) and/or displayed for review by a manager or agent of the business 110.

Figure 4:
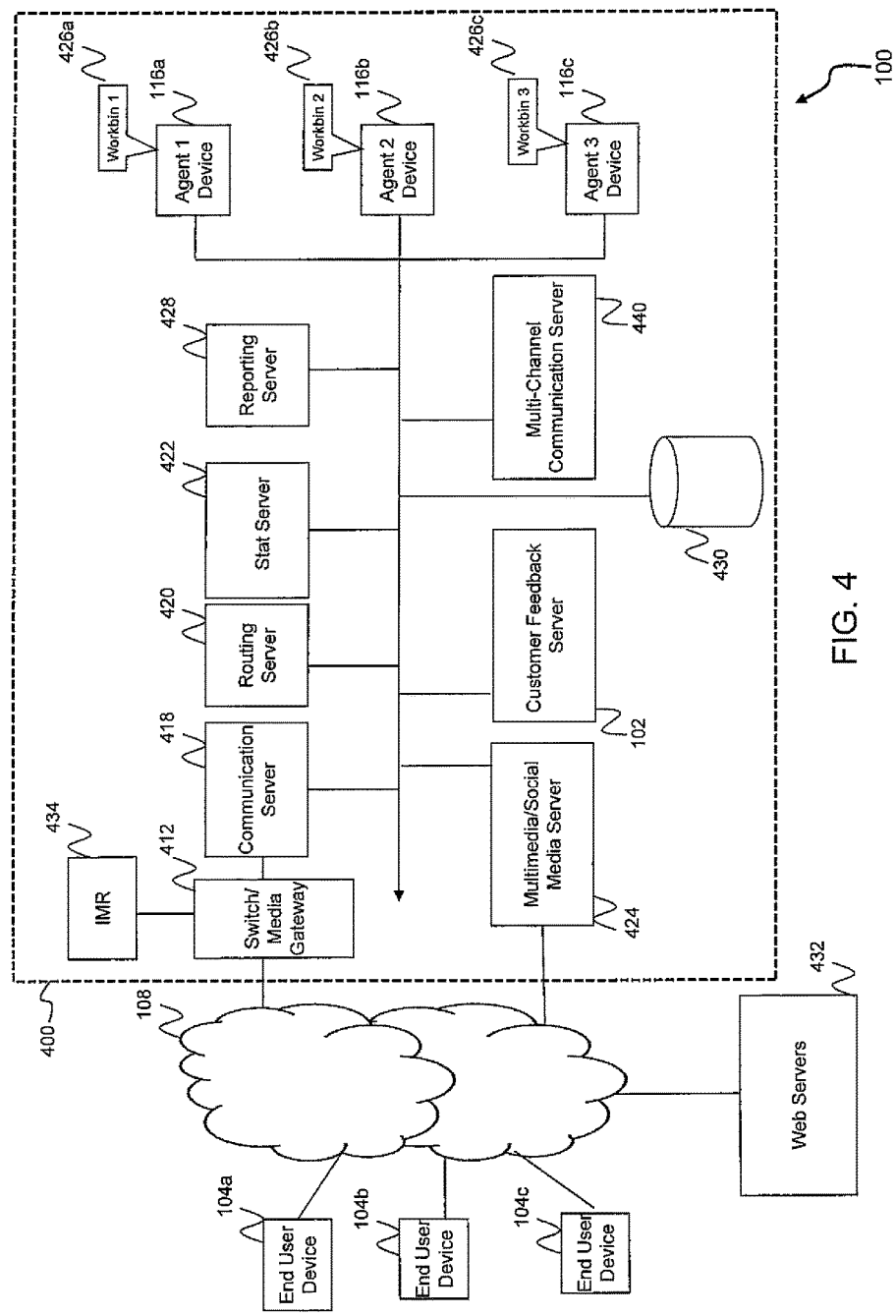
FIG. 4 illustrates further detail of a customer feedback management system according to some embodiments of the present invention.

FIG. 4 shows further detail of the customer feedback management system 100 according to some embodiments of the present invention. In some embodiments, the business 110 may additionally support or include a contact center 400 providing contact center services in furtherance of its business objectives. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers, e.g., customer 106) desiring to receive services from the contact center 400 or the business 110 may initiate an inbound communication to the contact center 400 via their end user devices 104a-104c (collectively referenced as electronic device 104). Each of the electronic devices 104 may be a communication device conventional in the art, such as, for example, a telephone, wireless phone, smart phone, personal computer, electronic tablet, and/or the like. Users operating the electronic devices 104 may initiate, manage, and respond to telephone calls, emails, chats, text messaging, web-browsing sessions, and other multi-media transactions.

Inbound and outbound communications from and to the electronic devices 104 may traverse the telephone, cellular, and/or data communication network 108 depending on the type of device that is being used. For example, the communications network 108 may include a private or public switched telephone network (PSTN), local area network (LAN), private wide area network (WAN), and/or public wide area network such as, for example, the Internet. The communications network 108 may also include a wireless carrier network including a code division multiple access (CDMA) network, global system for mobile communications (GSM) network, and/or any 3G or 4G network conventional in the art.

According to one exemplary embodiment, the contact center 400 includes a switch/media gateway 412 coupled to the communications network 108 for receiving and transmitting communications between end users and the contact center 400. The switch/media gateway 412 may include a telephony switch or communication switch configured to function as a central switch for agent level routing within the center. In this regard, the switch 412 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a communication server 418 which may, for example, serve as an adapter or interface between the switch and the remainder of the routing, monitoring, and other communication-handling components of the contact center.

The contact center may also include a multimedia/social media server 424 for engaging in media interactions other than voice interactions with the end user devices 104 and/or web servers 432. The media interactions may be related, for example, to email, vmail (voice mail through email), chat, video, text-messaging, web, social media, co-browsing, and the like. The web servers 232 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch 412 is coupled to an interactive media response (IMR) server 434, which may also be referred to as a self-help system, virtual assistant, or the like. The IMR server 434 may be similar to an interactive voice response (WR) server, except that the IMR server 434 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 434, customers may complete service without needing to speak with an agent. The IMR server 434 may also ask an open ended question such as, for example, "How can I help you?" and the customer may speak or otherwise enter a reason for contacting the contact center. The customer's response may then be used by the routing server 420 to route the call or communication to an appropriate contact center 400 resource.

If the communication is to be routed to an agent, the communication may be forwarded to the communication server 418 which interacts with a routing server 420 for finding an appropriate agent for processing the communication. The communication server 418 may be configured to process PSTN calls, VoIP calls, and the like, or other text or non-audio based communications (e.g., chat sessions). For example, the communication server 418 may include a session initiation protocol (SIP) server for processing SIP calls. According to some exemplary embodiments, the communication server 418 may, for example, extract data about the customer interaction such as the customer's telephone number, often known as the automatic number identification (ANI) number, or the customer's internet protocol (IP) address, or email address.

In some embodiments, the routing server 420 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 430. The routing server 420 may query the customer information from the customer database via an ANI or any other information collected by the IMR 434 and forwarded to the routing server by the communication server 418.

Once an appropriate agent is available to handle a communication, a connection is made between the customer and the agent device 116a-116c (collectively referenced as 116) of the identified agent. Collected information about the customer and/or the customer's historical information may also be provided to the agent device for aiding the agent in better servicing the communication. In this regard, each agent device 116 may include a telephone adapted for regular telephone calls, VoIP calls, and the like. The agent device 116 may also include a computer for communicating with one or more servers of the contact center and performing data processing associated with contact center operations, and for interfacing with customers via voice and other multimedia communication mechanisms.

The selection of an appropriate agent for routing an inbound communication may be based, for example, on a routing strategy employed by the routing server 420, and further based on information about agent availability, skills, and other routing parameters provided, for example, by a statistics server 422.

The contact center 400 may also include a reporting server 428 configured to generate reports from data aggregated by the statistics server 422. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 420 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 426a-426c (collectively referenced as 426) as a task to be completed by the agent. The agent's workbin may be implemented via any data structure conventional in the art, such as, for example, a linked list, array, and/or the like. The workbin may be maintained, for example, in buffer memory of each agent device 116.

According to one exemplary embodiment of the invention, the mass storage device(s) 430 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device 430 may take form of a hard disk or disk array as is conventional in the art.

The contact center 400 may additionally include the customer feedback server 102 as described above with respect to FIGS. 1-3 for facilitating generating customer feedback survey questions and receiving customer feedback in the form of survey question answers from customers operating the end user devices 104a-104c.

The contact center 400 may also include a multi-channel communication server 440 operating as a multichannel communications platform (e.g., in a cloud-based environment) to route various types of communications (e.g., voice, interactive text messaging, automated voice messaging, inbound interactive voice response (IVR), email, chat messages, etc.) between an end user device 104 and agent device 116. Additionally, as will be discussed in more detail below, when a customer is identified as being a detractor by the customer feedback server 102, as discussed above, the multi-channel communication server 440 may be configured to automatically generate and send a message to an agent or manager operating an agent device 116.

The various servers of FIG. 4 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 5:
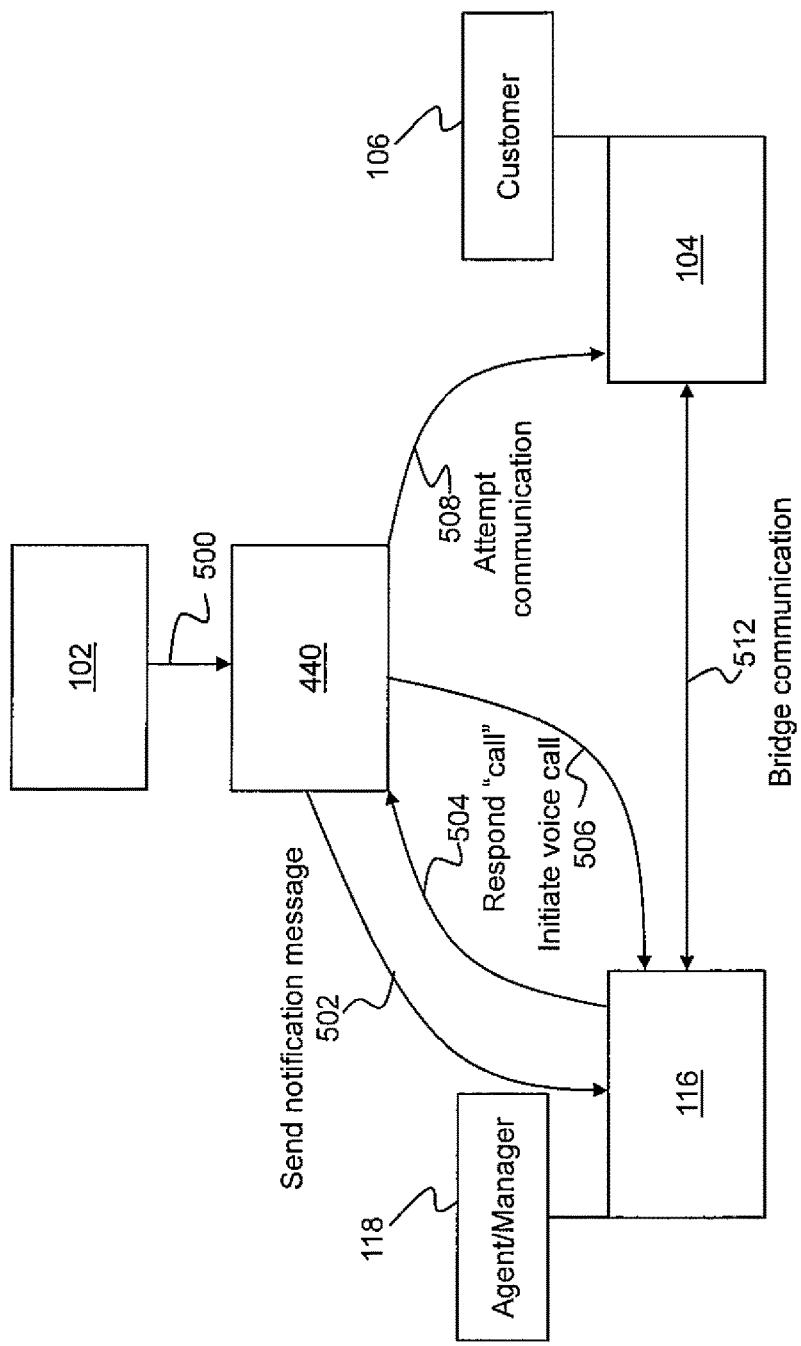
FIG. 5 is a signaling flow diagram illustrating various interactions between components of the customer feedback management system in response to identifying the customer as a detractor according to some embodiments of the present invention.

FIG. 5 is a signaling flow diagram illustrating various interactions between the multi-channel communication server 440, an agent or manager electronic device 116, and a customer electronic device 104 in response to identifying the customer operating the electronic device 104 as a detractor. The numbering and arrangement of the operations shown in the flow diagrams according to embodiments of the present invention does not imply that the operations must occur in every instance, or that the operations must be performed in a particular order, unless noted in the description of the flow diagram. For example, some operations disclosed with respect to the example embodiments may not be performed depending on the design and function of the customer feedback management system 100.

Referring to FIG. 5, the multi-channel communication server 440 is in electronic communication with, or is configured to send electronic communications to and from, the electronic devices 116 and 104 as discussed above with respect to FIG. 4. Additionally, the multi-channel communication server 440 is in electronic communication with the customer feedback server 102 as discussed with respect to FIG. 4.

At operation 500, the customer feedback server 102 sends, and the multi-channel communication server 440 receives, a message or signal indicating the customer 106 operating the electronic device 104 has been identified as a detractor of the business 110 (e.g., in response to survey questions answered by the customer 106 as discussed above with respect to FIGS. 1-3). In response to receiving the indication that the customer 106 has been identified as a detractor, at operation 502, the multi-channel communication server 440 identifies or selects an appropriate agent or manager operating an electronic device 116 and sends a notification message or communication to the electronic device 116 operated by the agent or manager 118. The appropriate agent or manager may be selected according to business rules of the business 110. For example, the selected agent or manager 118 may be a manager in charge of the product line, the particular client or customer account, the manager of an agent who interacted with the customer, the manager or agent of the store selling the product or service purchased by the customer, or any other appropriate agent or manager according to the design of the customer feedback management system 100 and the needs of the business 110.

The notification includes an indication that the customer 106 has been identified as a detractor (e.g., the net promoter score associated with the customer 106). The notification may also include additional information about the customer 106 (e.g., personal profile, location, and demographic information, etc.) as well as purchasing history of the customer 106. The notification may further include the responses to survey question answered by the customer 106. Alternatively, the notification may include customer identification information or other mechanism for the agent or manager 118 to further research information about the customer 106.

The notification additionally asks the agent or manager 118 whether or not the agent or manage would like to contact the customer 106. At operation 504, if the agent or manager 118 would like to contact the customer 106 to attempt to resolve the customer's complaints, the agent or manager 118 sends a reply message to the communication server 440 to attempt to initiate communication with the customer 106. In one embodiment, the initial notification at operation 502 is a short message service (SMS) text message sent to the electronic device 116, to which the agent or manager 118 may send a simple response message reply (e.g., "call") to initiate contact with the customer 106. In another embodiment, the initial notification at operation 502 may be an email or other electronic communication sent to the electronic device 116, in which the agent or manager may click a link or embedded graphical button to initiate communication with the customer 106.

Upon receiving the reply message at operation 504, at operation 506, the communication server 440 initiates a voice call to the electronic device 116 by, for example, transmitting an SIP INVITE message to the electronic device 116. Thus, the agent may send a reply message in a first communication channel (e.g., an SMS text message) in response to receiving the notification message at operation 502 to automatically initiate a communication in a second communication channel (e.g., voice call) that is different from the first communication channel to communicate with a customer that is identified as a detractor. The agent need not provide any additional identification or addressing information (e.g., telephone number) for the customer as part of the reply. Instead, by merely sending the reply message, the agent may initiate the communication with the customer. Once a voice call connection is made with the electronic device 116, the communication server 440 initiates a voice communication with the electronic device 104 at operation 508. If the voice communication with the electronic device 104 is successful, the communication server 440 bridges the voice communication between the electronic device 116 operated by the agent or manager 118 and the electronic device 104 operated by the customer 106.

In some embodiments, prior to bridging the voice communication between the electronic device 116 and the electronic device 104, the customer feedback management system 100 may first initiate a separate communication with the customer 106 and receive confirmation from the customer 106 (e.g., using IVR questions, text messages, etc.) that the customer agrees to communicate with the agent 118. Thus, in some embodiments, the customer feedback management system 100 bridges or connects the electronic device 104 with the electronic device 116 only after receiving confirmation from the customer 106 that the customer agrees to communicate with the agent 118.

In some embodiments, if the voice communication with the electronic device 104 is not successful at operation 508, the communication server 440 may attempt to escalate the communication attempt to other channels of communication to contact the customer 106. For example, the communication server 440 may attempt to contact alternative contact phone numbers for the customer 106, or may send an automated voice message or email message to the customer 106.

Although the functionality of the multi-channel communication server 440 is described above as being performed by a single server system, various functions of the multi-channel communication server 440 may be performed by separate components. For example, the voice communication connection and routing functions may be performed by separate call and routing servers (e.g., the communication server 418 and the routing server 420 shown in FIG. 4), and other non-voice communication connections may be facilitated using a separate multimedia/social media server (e.g., the multimedia/social media server 424 shown in FIG. 4).

Figure 6:
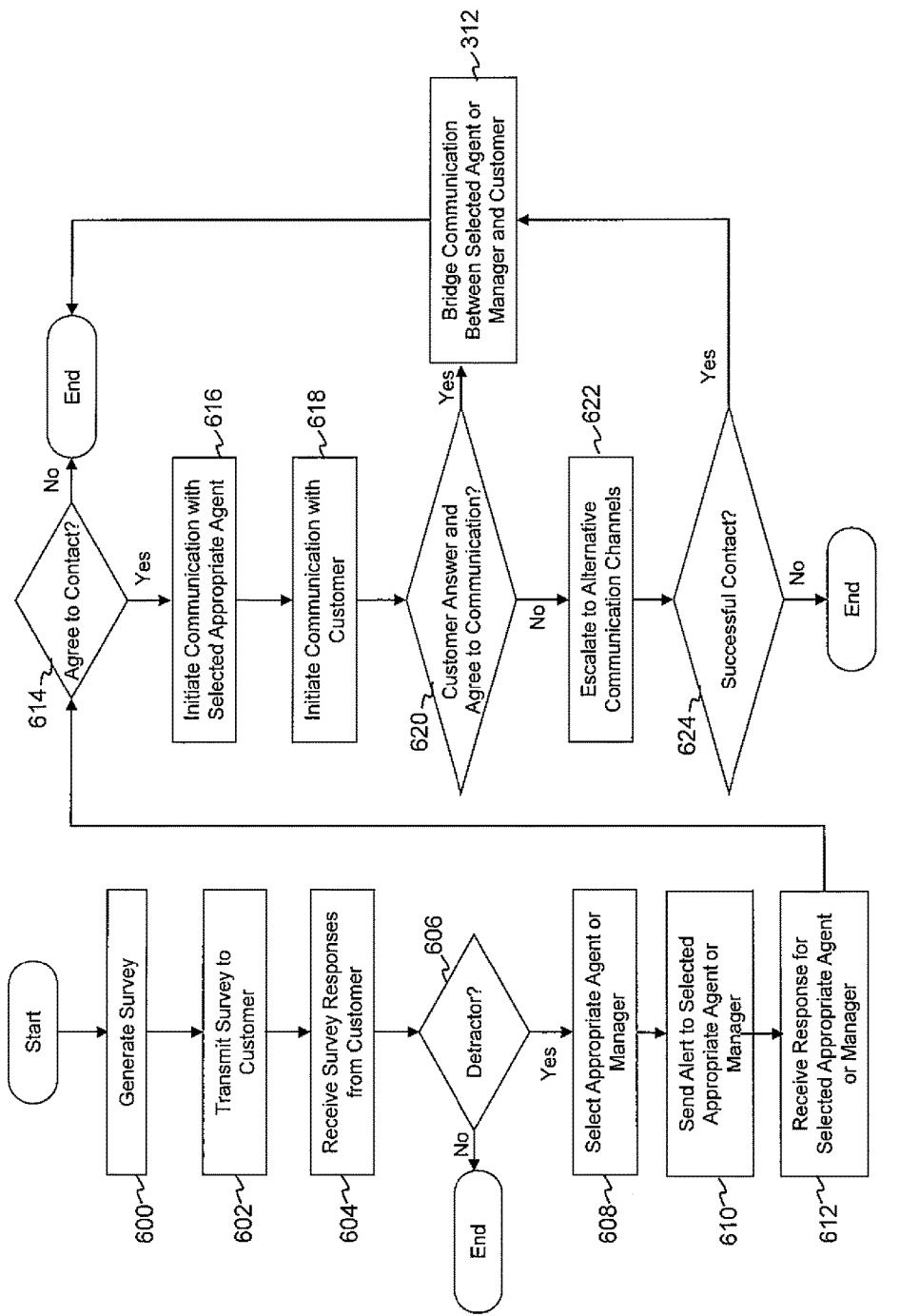
FIG. 6 illustrates a process for automatically initiating a communication with a customer in response to determining that the customer is a detractor according to embodiments of the present invention.

FIG. 6 illustrates a process for automatically initiating a communication with a customer in response to determining that the customer is a detractor according to embodiments of the present invention. The process starts and, at block 600, the manager or agent 118 operating with the customer feedback management system 100 generates a survey including one or more survey questions regarding the products or services provided by the business 110. The survey questions invite customers to rate aspects of the business 110, for example, as discussed above with respect to FIGS. 1-3.

At block 602, the customer feedback management system 100 transmits the survey questions to a customer (e.g., customer 106) at the completion of an interaction with the business 110. For example, the survey questions may be sent to the customer by way of a customer interface 112 as discussed above with respect to FIG. 1, or the survey questions may be transmitted by way of an IVR audio-based survey following a voice communication with an agent of the business 110.

At block 604, the customer feedback management system 100 receives survey responses from the customer and based on the customer's answers to the questions, at block 606, the customer feedback management system 100 determines whether or not the customer is a detractor of the business 110 or its products or services. The determination of whether or not the customer constitutes a detractor may be performed according to any suitable algorithm known in the art for determining whether a customer is a detractor (e.g., by performing a "net promoter score" analysis on the answers provided by the customer).

If the customer 106 is not a detractor, the customer feedback management system 100 may not initiate communication with the customer and the process may end. If, however, the customer is identified as a detractor, the customer feedback management system 100 proceeds to block 608, where the customer feedback management system 100 selects an appropriate agent or manager to contact the customer.

Once an appropriate agent or manager is selected, at block 610, an alert notification is transmitted to the selected agent or manager as discussed above with respect to FIG. 5 to notify the selected agent or manager that the customer has been identified as a detractor. At block 612, the customer feedback management system 100 receives a response message from the selected agent or manager and proceeds to block 614. If the selected agent or manager does not agree in the reply message to contact the customer, the customer feedback management system 100 may not initiate a communication with the customer. In some embodiments, the alert notification transmitted at block 610 may expire after a pre-determined amount of time (e.g., 24 hours) such that the selected agent can no longer automatically initiate a communication with the customer after the pre-determined amount of time. If the selected agent or manager agrees in the reply message to contact the customer, the customer feedback management system 100 proceeds to block 616 to initiate a voice communication with the selected agent or manager.

At block 618, once the voice communication is established with the selected agent or manager, the customer feedback management system 100 initiates a voice communication with the customer. At block 620, if the customer answers the voice communication and agrees to communicate with the selected agent or manager, the customer feedback management system 100 bridges the voice communication between the selected agent or manager and the customer.

If, however, at block 620, the voice communication is not successful with the customer, the customer feedback management system 100 may attempt to escalate the communication to alternative communication channels as discussed above with respect to FIG. 5. At block 624, if there is a successful contact with the customer after escalating to alternative communication channels, the customer feedback management system 100 may bridge the communication between the selected agent or manager and the customer. On the other hand, if there is not successful contact with the customer after escalating to alternative communication channels, the process may end.

Accordingly, the customer feedback management system according to embodiments of the present invention enable businesses to solicit feedback from customers and attribute the customers answers to relevant KPIs that are generally applicable across the business enterprise and not only narrowly tailored to the specific interests of the creator of the survey questions. After all, survey questions may be phrased in many different ways and in any given survey the questions may be asked in many different orders. Further, customers may not always complete an entire survey. Therefore, embodiments of the present invention provide a system and method for enabling businesses to solicit feedback by attributing survey questions to relevant KPIs and normalizing any survey responses for a wide variety of survey questions. Thus, even though the wording of survey questions may change, the types of questions may change, and/or surveys may only be partially completed by consumers, any input that is obtained from the consumers in response to the surveys can be used to generate meaningful data about KPIs that may be relevant across the entire platform.

Additionally, obtaining customer feedback may enable a business enterprise to identify individual customers as promoters or detractors of the business enterprise. When a customer is a promoter of a business enterprise or its products or services, the customer is likely to continue to engage in business with the business enterprise and may also influence colleagues and friends to conduct business with the business enterprise. By contrast, when a customer is a detractor of a business enterprise or its products or services, the customer is less likely to continue conducting business with the business enterprise and may actually influence others to avoid interacting with the business enterprise as well. Merely identifying a customer as a detractor, however, provides no value to a business enterprise unless there is a mechanism to take some action to resolve the customer's concerns. Businesses have an incentive, therefore, to not only identify detractors, but also to quickly and efficiently reach out to detractors and make an effort to convert them into promoters before their influence causes harm to the reputation of the business.

Therefore, when a customer is identified as a detractor of products or services provided by a business, or of the business itself, according to embodiments of the present invention, the customer feedback management system operates to provide agents or managers of the business a mechanism to quickly, conveniently, and automatically initiate a communication with the customer to make an effort to resolve the customer's concerns. A notification is automatically sent to an appropriate manager or agent, who is offered an opportunity to communicate with the customer. If the manager agrees, a voice communication is automatically initiated with the manager or agent and an effort is made to establish a voice communication with the customer. The customer feedback management system then bridges the two parties in a communication session (e.g., a voice communication conference), at which point the manager or agent can discuss the customer's concerns and take any reasonable actions to convert the customer from a detractor into a promoter of the business.

Each of the various servers, controllers, switches, gateways, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
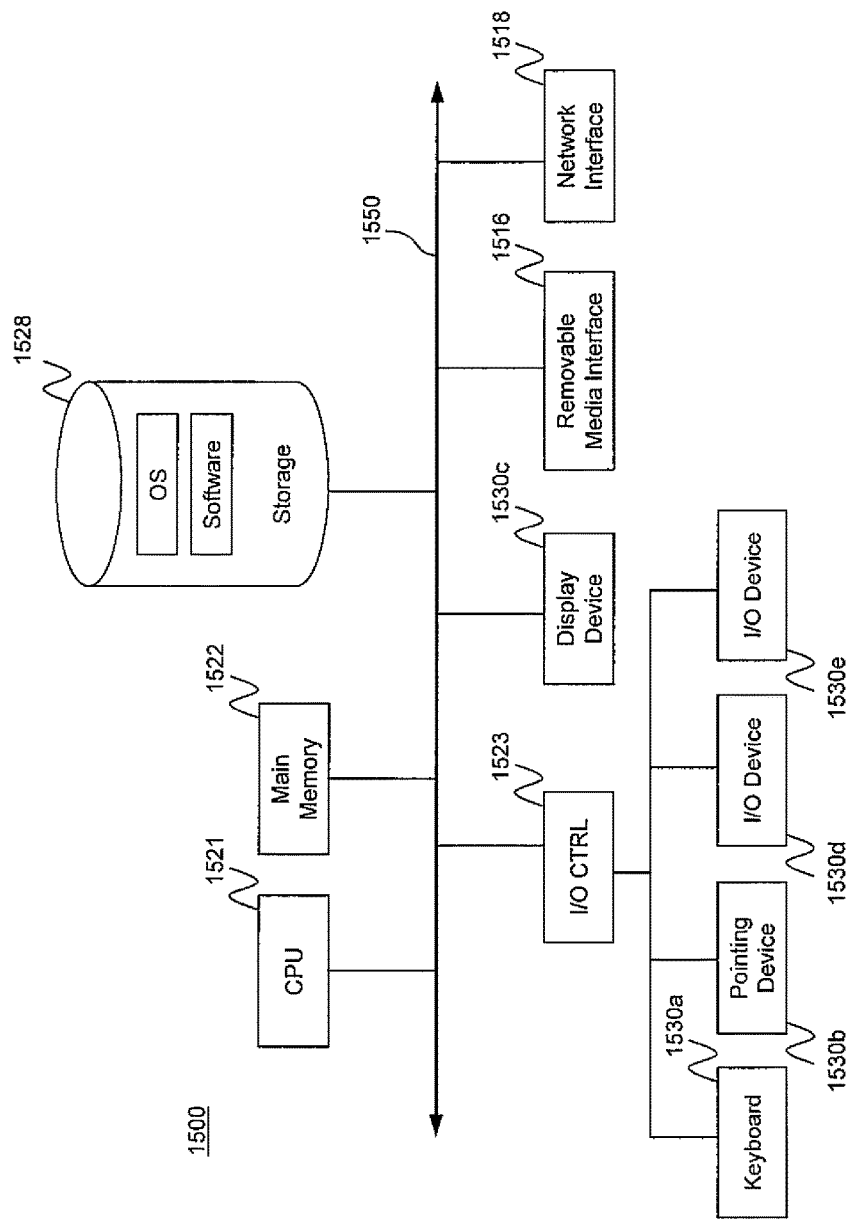
FIG. 7A is a block diagram of a computing device according to an embodiment of the present invention.
Figure 7B:
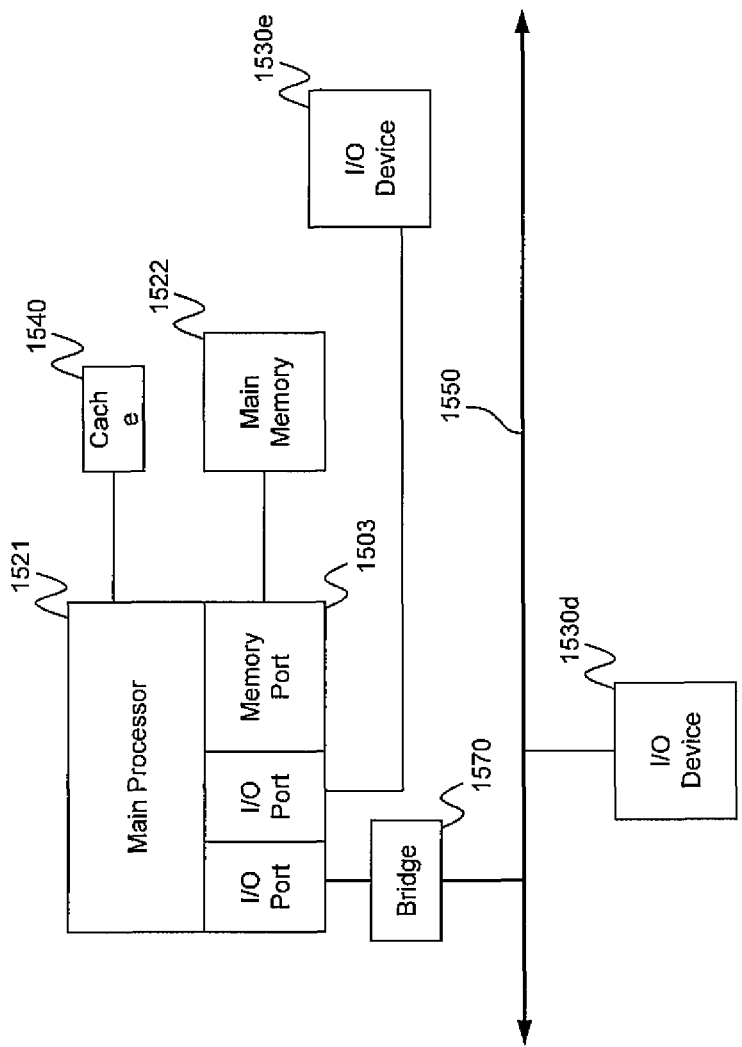
FIG. 7B is a block diagram of a computing device according to an embodiment of the present invention.

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7D:
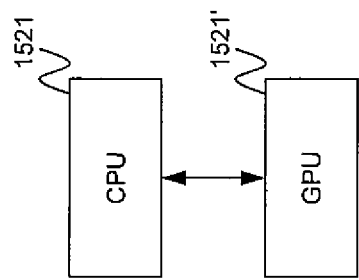
FIG. 7D is a block diagram of a computing device according to an embodiment of the present invention.
Figure 7C:
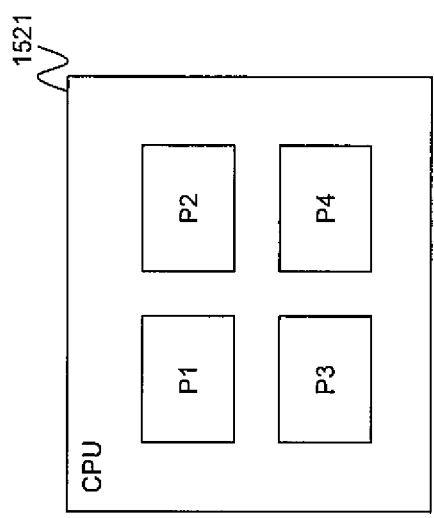
FIG. 7C is a block diagram of a computing device according to an embodiment of the present invention.

As shown in FIG. 7C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
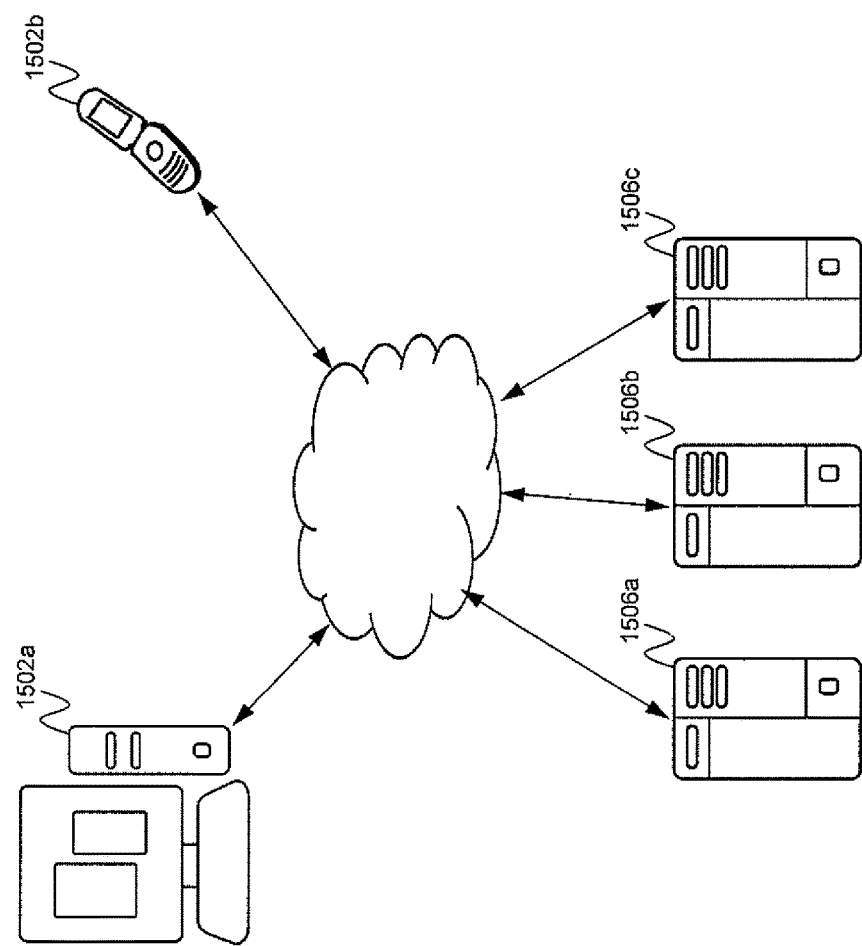
FIG. 7E is a block diagram of a network environment including several computing devices according to an embodiment of the present invention.

A computing device may be one of a plurality of machines connected by a network, or it may comprise a plurality of machines so connected. FIG. 7E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for automatically triggering a communication session the method comprising:
   receiving, by a processor, an answer to a survey question, wherein the answer to the survey question is associated with a customer;
   identifying, by the processor, an agent for handling a communication session with the customer, in response to the answer to the survey question having a value less than a threshold value, wherein the identifying of the agent for handling the communication comprises accessing pre-stored profile data corresponding to a plurality of agents, and automatically identifying a profile corresponding to the agent from among the plurality of agents based on the profile comprising information indicating a proficiency level for a subject matter of the survey question;
   automatically transmitting, by the processor, a short message service notification message to a first electronic device operated by the agent;
   receiving, by the processor, a short message service reply communication via a short message service communication medium from the first electronic device operated by the agent, wherein the short message service reply communication indicates an instruction to contact the customer;
   after receiving the short message service reply communication, automatically transmitting, by the processor, a signal to a switch to initiate a voice communication with a second electronic device associated with the customer requesting permission to initiate a connection with the first electronic device;
   after automatically transmitting the signal to the switch to initiate the voice communication with the second electronic device associated with the customer, detecting, by the processor, the voice communication with the second electronic device is not successful;
   in response to detecting the voice communication with the second electronic device is not successful, automatically initiating, by the processor, a communication with the second electronic device or another device associated with the customer via an alternative communication channel;
   receiving, by the processor, a confirmation from the second electronic device or the another device associated with the customer indicating permission to initiate the communication via the alternative communication channel;
   receiving, by the processor, a signal confirming successful connection for an alternative channel communication with the second electronic device or the another device via the alternative communication channel; and
   after receiving the signal confirming the successful connection with the second electronic device or the another device via the alternative communication channel, automatically transmitting, by the processor, a signal to the switch to bridge the alternative channel communication between the first electronic device operated by the agent and the second electronic device or the another device associated with the customer in the alternative communication channel.

2. The method of claim 1, further comprising transmitting, by the processor, the survey question to the second electronic device.

3. The method of claim 1, further comprising initiating, by the processor, a first communication with the first electronic device and a second communication with the second electronic device prior to the initiating of the connection of the first electronic device to the second electronic device.

4. The method of claim 1, further comprising transmitting, by the processor, profile information regarding the customer.

5. The method of claim 1, wherein the notification comprises a short message service text message.

6. The method of claim 1, wherein the reply communication comprises a short message service text message.

7. The method of claim 1, further comprising initiating one or more alternative communications to one or more electronic devices associated with the customer in response to the connection between the first electronic device and the second electronic device not being successful.

8. The method of claim 1, further comprising:
   identifying, by the processor, a plurality of key performance indicators (KPIs); and generating, by the processor, a user interface for creating the survey question and establishing a relative weight for a corresponding key performance indicator among the plurality of KPIs.

9. The method of claim 1, further comprising:
   associating, by the processor, the answer to the survey question with a corresponding key performance indicator (KPI);
   calculating, by the processor, a KPI score for the answer to the survey question based on the corresponding KPI and the answer to the survey question normalized to a predetermined range of scores; and
   outputting, by the processor, the KPI score for prompting an action in response.

10. A system for automatically triggering a communication session, the system comprising:
    a switch configured to receive a plurality of communications for routing to one or more contact center resources;
    a processor coupled to the switch; and
    a memory coupled to the processor, wherein the memory stores instructions that, when executed by the processor, cause the processor to:

receive an answer to a survey question, wherein the answer to the survey question is associated with a customer;

identify an agent for handling a communication session with the customer, in response to the answer to the survey question having a value less than a threshold value, wherein the identifying of the agent for handling the communication comprises accessing pre-stored profile data corresponding to a plurality of agents, and automatically identifying a profile corresponding to the agent from among the plurality of agents based on the profile comprising information indicating a proficiency level for a subject matter of the survey question;

automatically transmit a short message service notification message to a first electronic device operated by the agent;

receive a short message service reply communication via a short message service communication medium from the first electronic device operated by the agent, wherein the short message service reply communication indicates an instruction to contact the customer;

after receiving the short message service reply communication, automatically transmit a signal to the switch to initiate a voice communication with a second electronic device associated with the customer requesting permission to initiate a connection with the first electronic device;

after automatically transmitting the signal to the switch to initiate the voice communication with the second electronic device associated with the customer, detect the voice communication with the second electronic device is not successful;

in response to detecting the voice communication with the second electronic device is not successful, automatically initiate a communication with the second electronic device or another device associated with the customer via an alternative communication channel;

receive a confirmation from the second electronic device or the another device associated with the customer indicating permission to initiate the communication via the alternative communication channel;

receive a signal confirming successful connection for an alternative channel communication with the second electronic device or the another device via the alternative communication channel; and after receiving the signal confirming the successful connection with the second electronic device or the another device via the alternative communication channel, automatically transmit a signal to the switch to bridge the alternative channel communication between the first electronic device operated by the agent and the second electronic device or the another device associated with the customer in the alternative communication channel.

11. The system of claim 10, wherein the instructions further cause the processor to transmit the survey question to the second electronic device.

12. The system of claim 10, wherein the instructions further cause the processor to initiate a first communication with the first electronic device and a second communication with the second electronic device prior to the initiating of the connection of the first electronic device to the second electronic device.

13. The system of claim 10, wherein the instructions further cause the processor to transmit profile information regarding the customer.

14. The system of claim 10, wherein the notification comprises a short message service text message.

15. The system of claim 10, wherein the reply communication comprises a short message service text message.

16. The system of claim 10, wherein the instructions further cause the processor to initiate one or more alternative communications to one or more electronic devices associated with the customer in response to the connection between the first electronic device and the second electronic device not being successful.

17. The system of claim 10, wherein the instructions further cause the processor to: identify a plurality of key performance indicators (KPis); and generate a user interface for creating the survey question and establishing a relative weight for a corresponding key performance indicator among the plurality of KPis.

18. The system of claim 10, wherein the instructions further cause the processor to:

associate the answer to the survey question with a corresponding key performance indicator (KPI);

calculate a KPI score for the answer to the survey question based on the corresponding KPI and the answer to the survey question normalized to a predetermined range of scores; and output the KPI score for prompting an action in response.

* * * * *